3,013,981
CALCINATION OF DIATOMACEOUS EARTH
Raymond G. Riede, Martinsville, N.J., assignor to Johns-Manville Corporation, New York, N.Y., a corporation of New York
No Drawing. Filed Oct. 21, 1957, Ser. No. 691,119
20 Claims. (Cl. 252—449)

This invention relates to the manufacture of an improved calcined diatomaceous earth, and more particularly to the manufacture of high filtration flow rate diatomaceous earth filter aids. This application is a continuation-in-part of my copending application Serial No. 461,653, filed October 11, 1954, now abandoned.

Filter aids formed from diatomaceous earth have been widely used in the filtration of various materials with present day conventional filtering equipment. As with all filter aids, those of diatomaceous earth are materials which serve to remove solids suspended from liquids by forcing the liquid through a permeable member which serves to retain the solid particles. In conventional filter presses, the porous member is often composed of a precoat of diatomaceous earth filter aid to which accretes additional filter aid suspended in the liquid to be filtered during filtration thereof. The porous filter cake formed by the diatomaceous earth particles, in the form of a rigid skeleton or lattice structure, is capable of entraining suspended gelatinous or fine particles present in the unfiltered liquid and yet leave channels in the filter cake through which the pure liquid, freed of its suspended matter, may pass at a rate and under such pressure differentials as are economically practical. It is generally recognized that there is an inverse correlation between filtration rate and clarity when employing any filter aid, and this relation in general holds true for a diatomaceous filter aid.

Particle size distribution and the structure of the particles of the filter aid determine the characteristics of the filter cake structure formed, and hence, of the flow rate and clarity obtained when a liquid is filtered through such a cake. It is recognized that materials with large proportions of fine particles form a relatively less porous filter cake than a filter aid of predominantly larger particles. For the same pressure differential, the flow rate of the fine particle size filter aid will be considerably less than that of the coarser filter aid. Inversely, the clarity of the filtrate through the less porous cake will normally be higher than that through the porous cake. Clarity is often the principal factor desired in the filtrate, and, hence, in order to obtain proper clarity, some filtration procedures must be carried out at high, uneconomical pressure differentials in order to get practical flow rates, or relatively slow flow rates are used when high pressure differentials are not possible.

To form a filter aid of diatomaceous earth particles it is conventional practice to crush, mill and dry the mined crude earth and separate the grit, rock, etc., associated with it usually by means of air classification. From the thus dried and cleaned earth most of the extreme fines, e.g., particles less than about 2–4 microns, are removed and the remainder is suitable for use as a filter aid. Various techniques have been used to manufacture diatomaceous earth filter aids with which could be obtained good filtrate clarities, yet more economical flow rates. The manufacture of higher flow rate filter aids has involved calcination of such raw diatomaceous earth particles. Calcining is ordinarily effected in a large rotary kiln with or without addition of an alkali metal flux, which is conventionally added in the form of powder blown into the earth before its entry into the kiln. The use of an added flux during calcination, as first proposed by Calvert et al., U.S. Patent No. 1,502,547, is normally employed when filter aids of the highest flow rate are desired. Calcination of the diatomaceous earth without flux results in a filter aid having a flow rate about twice that of a filter aid of cleaned and sized raw diatomaceous earth, when compared in the filtration of raw sugar liquor. Those formed by a calcining procedure including the use of flux exhibit a flow rate approximately 5 times that of the uncalcined diatomaceous earth filter aid. Higher flow rate products can be secured by air classification of the product of flux calcination, and the best commercial filter aid, formed in such a manner, exhibits a flow rate of approximately 18 times that of raw diatomaceous earth, or 9 times that of the product obtained by straight calcination, or 3 times that obtained with the product of a flux calcination procedure. Clarity obtained in the filtrate of the raw sugar solution would range from about 85% of that obtained with the natural powder when using a straight calcined filter aid, through about 60% of that of the natural powder when using the flux calcined product, down to about 30% of that of the natural powder when using the fastest flow rate air classified flux calcined product. Obviously, it would be extremely advantageous if diatomaceous earth filter aids could be obtained, which would give clarities comparable to those obtained with the calcined products and yet enable flow rates of the order of those obtained with the air classified flux calcined products.

In high grade diatomaceous earth deposits, as for example, in those near Lompoc, California, not all of the diatomaceous earth present is sufficiently pure to enable the manufacture of filter aids therefrom. Such unsuitable crude diatomaceous earth contains relatively high amounts of impurities such as clay, quartz, organic matter, etc., and do not have proper structure for the formation of proper filter cakes. Since a deposit normally contains substantial amounts of such unsuitable material, it would be extremely advantageous if a procedure could be devised to enable the use of this material in the manufacture of a filter aid.

The manufacture of conventional fast flow rate diatomaceous earth filter aids requires the use of relatively high calcining temperatures, as, for example, about 1900–2200° F., in order to obtain sufficient sintering of individual particles to result in a material with a relatively coarse particle size distribution. Obviously, such high calcining temperatures are disadvantageous from the standpoint of fuel costs, high kiln wear, and maintenance expenses for the calcining equipment. Such temperatures also have the disadvantage of causing the formation of some hard, dense glassy aggregates when flux is used. Obviously, if lower calcining temperatures could be employed in the formation of high flow rate filter aids, and these objectionable characteristics overcome, substantial commercial benefit would be obtained.

It would also be advantageous if fast flow rate materials comparable to those now obtained by air classification of flux calcined diatomaceous earth could be obtained without separation treatments of the calcined product. Obviously, air classification of the product of the kiln is relatively expensive, and since only a fraction of the kiln discharge forms the fast flow rate filter aid and the remaining fraction is not suitable for filter aid purposes, an uneconomic loss of material is involved.

Accordingly, it is an object of this invention to provide a method of treating diatomaceous earth to obtain therefrom a filter aid having high flow rate characteristics and good clarifying characteristics.

It is another object of this invention to provide a method of calcining diatomaceous earth whereby the kiln discharge product will exhibit faster flow rates than heretofore obtained without air classification, and yet exhibit clarities comparable to those obtained with slower flow rate products.

It is an additional object of this invention to provide a method of treating crude diatomaceous earth particles heretofore considered unsuitable for the manufacture of filter aid products to obtain products having flow rates and clarification characteristics rendering them suitable for use as filter aids.

It is another and more specific object of this invention to provide a method of manufacturing diatomaceous earth filter aids of fast flow rate characteristics while using calcining temperatures considerably less than those heretofore considered necessary.

These and other objects of the invention will become apparent from consideration of the following detailed description of the invention.

It has been found that the foregoing objects, among others, are accomplished by calcining the diatomaceous earth in the form of discrete agglomerates. Clean, raw diatomaceous earth may be readily coalesced into discrete agglomerates by means of a relatively simple pre-calcination treatment described hereinafter. Once agglomerated the raw earth may be calcined in any conventional manner, for example, calcination may be carried out immediately after agglomeration or at any time thereafter, with the diatomaceous earth in either a wet or dry condition, and with or without flux.

In carrying out the procedure of this invention, the crude diatomaceous earth is initially prepared in accordance with known conventional procedures. After mining, the crude wet earth is crushed and dried. The grit, rock and similar impurities are usually removed therefrom, preferably by air classification, and most of the fines, i.e., the materials with particle size less than about 2–4 microns, are preferably removed from the product. In conventional procedure the thus formed product is then fed directly to the kiln.

In accordance with this invention the cleaned raw diatomaceous earth is agglomerated prior to its entry into the kiln. The raw diatomaceous earth particles are charged to a mixing device which will serve to agitate the materials by a mixing procedure which substantially preserves the structure and particle size of the diatomite. Any suitable mixing device which will not exert a destructive force upon the structure of the particles may be employed in this stage of the procedure. Such mixing devices as a ribbon mixer, paddle mixer, tumble mixer or the type of a rotary mixer which carries the material up the sides of the drum where it will cascade down by gravitational forces (e.g., cement type mixer), conical or V-type blender, etc., may be employed.

To the moving mass of particles is then added a suitable liquid in amount sufficient to plasticize the mixture, i.e., approximately 10–100% by weight of the dry earth. It is essential in the formation of discrete agglomerates that the liquid be added to the moving mass of material in the form of finely divided atomized droplets as, for example, by spraying. The mixing is continued for a sufficient length of time to enable thorough distribution of the finely divided droplets through the mass of moving diatomaceous earth to result in a plasticized mixture of materials in the form of discrete agglomerates having a bulk density substantially similar to the untreated earth particles (e.g., about 8.5 as opposed to about 7.5) and a flowability substantially the same as the dry earth particles, thereby enabling the use of conventional transporting and feeding devices in its processing. Dependent upon the size of the mixing chamber and the rate of spraying of the liquid, the materials are mixed from approximately 1–60 minutes, preferably about 2–20 minutes.

Since the liquid must be added in the form of finely divided atomized droplets, such as those obtained with conventional spraying equipment, it is apparent that the liquid must have the characteristic of sufficient fluidity at ambient or elevated temperatures to enable it to be atomized and deposited upon the moving mass of particles. Water is the preferred liquid for use in this invention, but other liquids having this characteristic have been found suitable. For example, liquids such as aqueous solutions, glycerine, oils (which may be heated to obtain the necessary fluidity), alcohols, petroleum solvents, etc., may be employed.

If the diatomaceous earth is to be calcined in the absence of added fluxing material, such as soda ash, sodium chloride, sodium silicate, lime, etc., the thus mixed materials may be fed directly from the mixer to the kiln and subjected to the necessary calcination temperatures. It is not necessary, however, to have the material in the wet state when fed to the kiln, since the advantages of this invention can be obtained when the material is dried after being sprayed, and then subsequently fed to the kiln for calcination.

If a flux calcined product is desired, any of the aforementioned conventional fluxes may be added to the mixture. Before or after the earth has been mixed with liquid, as heretofore indicated, a flux in the dry particulate form may be added to the charge of earth and blended therewith. When water is employed, as in the preferred embodiment of the invention, instead of spraying water alone onto the tumbling mass of earth particles, and employing a dry flux, a solution of the flux may be formed and the solution sprayed into the moving mass of particles. Due to the apparent economies in the addition of the two materials in the form of a solution rather than two separate products, this latter procedure is preferred for formation of flux calcined products in accordance with this invention. Obviously, the concentration of flux solution used in accordance with this procedure must be determined by two factors. The amount of water present in the solution must be present within the aforementioned range of 10–100% by weight of the dry earth particles. The amount of flux which must be added to the diatomaceous earth is dependent upon the degree of sintering desired, which, in turn, is dependent upon the melting point curve between the flux and the siliceous diatomite. Preferably the flux solids will be added to the earth particles in amount up to approximately 20% by weight thereof, and in most instances approximately 2–12% by weight is used. Considering these separate determinative factors for water and flux a solution of the desired concentration can be formed.

As heretofore indicated, filter aids manufactured by a straight calcining procedure, i.e., a calcining procedure wherein no fluxing agent is used, have exhibited flow rates approximately double that of the natural earth calcined. In order to get filter aids with flow rates substantially higher than double that of the original material, a flux calcining procedure has been heretofore required. As shown in the following example, this invention enables the manufacture of filter aids with flow rates substantially higher than those heretofore obtained with a straight calcining procedure without the use of an added flux.

Example I

Two samples of milled, dried and cleaned diatomaceous earth particles having the following characteristics were provided:

| | | |
|---|---|---|
| Loose weight | lbs./cu. ft. | 7.6 |
| Wet density | do | 16.6 |
| Moisture | percent | 3.0 |
| On 150 mesh | do | 0.4 |
| On 325 mesh | do | 6.2 |
| Crystalline content | do | 5.0 |
| Small fragments | | 45–55 |

The samples exhibited a filtration rate of 7.55 gals./sq. ft./hr. when evaluated by filtering 60° Brix raw sugar syrup at 80° C. using a filter aid dosage of 0.35% based upon the weight of sugar solids, and exhibited a clarity of 7.72 ft. candles, as measured by the intensity of a Tyndall beam, caused by the turbidity in the sample. One sample, designated "A," was calcined in conventional manner in a rotary kiln, using a calcination temperature of 1825° F. and a retention time of 30 minutes. The second sample, designated "B," was charged to a ribbon type mixer and while being agitated, sprayed with water in amount approximately 50% by weight of the diatomaceous earth, with mixing being maintained for a total of approximately 20 minutes. The thus treated diatomaceous earth was then fed to the rotary kiln in the same manner as sample "A" and was calcined under exactly the same calcining conditions. After calcination the kiln discharged samples were milled in a similar manner through a Gruendler mill fan. The samples exhibited the following product properties and filtration characteristics:

|  | Sample "A" | Sample "B" |
|---|---|---|
| Wet density, lb./cu. ft. | 14.0 | 14.2 |
| Retained on 150 M. Sieve, percent | 1.0 | 1.0 |
| Retained on 325 M. Sieve, percent | 4.0 | 3.1 |
| pH | 7.3 | 7.1 |
| Sugar flow rate vs. Original material as 100%, percent | 250 | 500 |
| Sugar clarity vs. Original material as 100%, percent | 85 | 61 |

As may be seen from the above data, sample "B," which was treated in accordance with this invention, exhibited a flow rate double that of the product formed in conventional manner, and yet exhibited good clarifying capacity. In fact, when compared with a filter aid formed in conventional manner with the use of an added flux, sample "B" exhibited a flow rate and clarity equivalent to the flux calcined product.

When the pretreatment procedure of this invention is employed in the manufacture of flux calcined diatomaceous earth filter aids, benefits at least equivalent to those exhibited in the preceding example are obtained. As illustrated in the following example, when the pre-calcining treatment procedure of this invention is used in the manufacture of flux calcined products, filter aids having flow rates comparable to those heretofore obtained only by air classification of a flux calcined product are obtained.

*Example II*

Four samples of the cleaned and milled diatomaceous earth product used as a starting material in Example I were treated in the following manners:

(1) Sample "A" was mixed with 5% of dry, pulverized soda ash, based upon the weight of the diatomaceous earth, in a ribbon type mixer for a period of about 15 minutes. The product was then calcined in a muffle furnace at 1850° F. for one hour.

(2) Sample "B" was sprayed with an aqueous solution of soda ash so that the ratio of the diatomaceous earth to water to soda ash was 100:50:5. The solution was sprayed upon the earth particles while being mixed in a ribbon type mixer and a total mixing time of about 15 minutes was employed. The thus treated product was then calcined in the same manner as sample "A."

(3) Sample "C" was mixed dry with 5% pulverized soda ash, based upon the weight of diatomaceous earth particles and then sprayed with water in amount 50% by weight of the diatomaceous earth, while being mixed in a ribbon type mixer for a mixing time of approximately 20 minutes, starting when the spraying commenced. The product was then calcined in the same manner as sample "A."

(4) Sample "D" was sprayed with 50% water while mixing in a ribbon type mixer. After spraying, pulverized soda ash in amount 5% by weight of the diatomaceous earth was added and the materials mixed for a total of 15 minutes. The product was then calcined in the same manner as sample "A."

(5) Sample "E" was prepared in the same manner as sample "C" except that a #2 Fuel Oil was sprayed on the earth instead of the water, in amount approximately 50% by weight of the earth.

All of the thus treated samples were milled in a similar manner after discharge from the kiln by dispersion through a conventional milling fan. The thus formed filter aids exhibited the following product properties and filtration characteristics:

|  | A | B | C | D | E |
|---|---|---|---|---|---|
| Wet Density, lb./cu. ft. | 12.5 | 13.6 | 14.5 | 14.3 | 13.0 |
| Retained on 150 M Sieve, percent | 6.8 | 4.9 | 9.0 | 5.6 | 9.3 |
| Sugar Flow Rate vs. Sample "A" as 100% | 100 | 200 | 202 | 200 | 214 |
| Sugar Clarity vs. Sample "A" as 100% | 100 | 70 | 67 | 64 | 50 |

The filtration characteristics of samples "B," "C," "D" and "E" were also tested against a faster flow rate filter aid than sample "A," a product comparable to the commercial filter aid marketed under the name "Hyflo Super-Cel." The faster flow rate filter aid was formed by air separation of sample "A" to remove therefrom the finer particles and large glassy aggregates and was equivalent to the commercial filter aid marketed under the name "Celite 503."

The samples of the example exhibited the following filtration characteristics, as compared to this air separated product:

|  | A | B | C | D | E |
|---|---|---|---|---|---|
| Sugar Flow Rate vs. Standard as 100%, Percent | 62 | 125 | 127 | 125 | 134 |
| Sugar Clarity vs. Standard as 100%, Percent | 155 | 110 | 106 | 99 | 77 |

As may be seen from this data, the filter aids, "B," "C," "D" and "E" exhibit better filtration characteristics than those heretofore obtained with an air-separated product comprising a coarse fraction of a conventional flux calcined product, such as sample "A." It is apparent that substantial commercial advantage is secured when the entire kiln discharge exhibits such filtration characteristics, since a classification procedure with its added expense and loss of filter aid yield is avoided.

As heretofore indicated, this invention enables the manufacture of good filter aids from crude diatomaceous earth products, not heretofore considered satisfactory for the manufacture of such materials. The following example illustrates that commercially satisfactory filter aids can be manufactured from such crude materials.

*Example III*

Two samples of milled, dried and cleaned, low grade diatomaceous earth crude having the product characteristics of:

| | |
|---|---|
| Loose weight | lb./cu. ft. 7.3 |
| Wet density | lb./cu. ft. 17.6 |
| Moisture | percent 1.4 |
| On 150 mesh | do 1.8 |
| On 325 mesh | do 11.3 |
| Crystalline content | do 5.0 |
| Whole and large fragments—Centricae | do 10–15 |
| Filiform fragments and Pennatae | do 5–10 |
| Small fragments and fines | do 55–60 | were provided. These samples exhibited a flow rate of 5.60 gals./sq.ft/hr., and a clarity of 7.66 ft. candles, when tested as indicated for the starting materials of Example I. Sample "A" was then mixed with 5% by weight of pulverized soda ash and calcined in a muffle furnace at 1830° F. for one hour. Sample "B" was charged to a ribbon mixer and sprayed with a solution of soda ash in water, so that the ratio of diatomaceous earth to water to soda ash was 100:50:5. The materials were mixed for a total of 15 minutes. The thus mixed material was then calcined under the same conditions as used in calcining sample "A." Samples "A" and "B," after calcination, were then tested to compare their filtration characteristics with a conventional flux calcined product, formed similarly to sample "A" of Example II. Sample "A," which was calcined after the addition of dry flux, exhibited a flow rate of 55% of the standard, whereas sample "B," calcined after pretreatment in accordance with this invention, exhibited a flow rate of 155% that of the standard. Sample "A" exhibited a clarity of 89% that of the standard and sample "B" exhibited a clarity of 63% that of the standard. From the foregoing data it is apparent that fast flow rate filter aids giving good clarities can be manufactured from diatomaceous earth crudes when employing the procedure of this invention.

It is apparent that one of the biggest expenses in calcining diatomaceous earth is due to maintaining, in the calcining kiln, the relatively high temperatures needed for proper calcination. When the procedure of this invention is employed, it is possible to obtain filter aids of good flow rates and clarities at substantially lower calcining temperatures than those presently required for the production of such materials. The following example illustrates this point.

Example IV

Nine samples of diatomaceous earth having the characteristics of the starting materials of Example I were calcined at various temperatures. Flow rate characteristics of the kiln discharge products were then compared with a standard comprising a conventional flux calcined product, formed similarly to sample "A" of Example II, and with the three samples treated in accordance with conventional procedures. Three groups of three samples each were formed. Each group was calcined at a different calcining temperature and individual samples of each group were treated in different manners before calcination. All samples designated "A" were calcined at about 1700° F.; those designated "B" at about 1850° F.; and those designated "C" at about 2050° F. Samples with subscript 1 were prepared by mixing a dry pulverized soda ash flux with the diatomaceous earth particles, in amount about 5% by weight of the earth. Samples with subscript 2 were prepared by mixing the diatomaceous earth with 5% by weight thereof of the same soda ash powder and then spraying the mixture with water in amount about 50% by weight of the earth while mixing for about five minutes. Samples with subscript 3 were prepared by spraying an aqueous solution of soda ash on the diatomaceous earth in amounts resulting in a diatomite to water to flux ratio of about 100:50:5 while mixing the materials for about five minutes. All samples were calcined under the same conditions at the aforementioned temperatures and the kiln discharge milled in a conventional manner. The filtration characteristics of the formed products were as follows:

| Sample | Flow Rate vs. Standard | Flow Rate vs. Samples A1, B1, C1 Respectively |
| --- | --- | --- |
| A1 | 61 | 100 |
| A2 | 115 | 189 |
| A3 | 119 | 195 |
| B1 | 67 | 100 |
| B2 | 147 | 220 |
| B3 | 137 | 202 |
| C1 | 103 | 100 |
| C2 | 163 | 158 |
| C3 | 175 | 170 |

This data clearly indicates that the procedure of this invention enables the formation of fast flow rate filter aids at calcining temperatures considerably lower than those required to make comparable products. Specifically, a temperature of about 2050° F. was required to produce a filter aid of the quality of the standard, a conventional commercial filter aid, whereas a filter aid of such quality could be made by the procedure of this invention when calcining temperatures as low as 1700° F. were employed.

As was noted heretofore, it is essential to this invention that the diatomaceous earth be moving when the liquid or flux solution is applied thereto, and that the liquid be applied to the earth in the form of finely divided atomized droplets. That these particular features of this invention are essential is indicated by a comparison of three filter aids formed in the following manner. Three samples of the starting materials employed in Example I were provided. Sample "A" was treated by spraying an aqueous solution of soda ash flux thereon, while the sample was being agitated in a ribbon mixer. The flux solution was applied to the earth in a diatomite to water to flux ratio of 100:50:6. The total mixing time was approximately 15 minutes. Sample "B" was mixed with about 6 parts thereof of dry soda ash and, after blending, water in amount approximately 50 parts by weight of the earth was added in a manner resulting in localized saturation of the earth and the materials mixed for a total of about 15 minutes. Sample "C" was prepared by adding the total charges of diatomite, flux and water in a 100:50:6 ratio to a mixer and allowing the material to soak during a comparable mixing period. After these pretreatments, all of the samples were calcined in a muffle furnace at 1830° F. for about 60 minutes. The kiln discharge products were milled in a conventional manner and then their filtration characteristics compared to a conventional commercial fast flow rate filter aid comprising an air separated fraction of a flux calcined product (Celite 503). The samples indicated the following characteristics when tested in the filtration of raw sugar liquor:

|  | Filtration vs. Standard as 100% ||
| --- | --- | --- |
|  | Flow Rate | Clarity |
| Sample A | 121 | 105 |
| Sample B | 80 | 143 |
| Sample C | 81 | 143 |

As may be seen from the foregoing data, addition of the fluid in the manner used for sample "B" and in toto as in sample "C," resulted in a filter aid having flow rate characteristics substantially less than that of the standard. On the other hand, the filter aid formed in accordance with this invention and employing the critical pretreatment procedure thereof exhibited a flow rate and clarification capacity substantially better than the standard.

As set forth hereinbefore, water, being readily sprayable and economical, among other apparent reasons, is the preferred liquid for effecting the precalcination agglomeration treatment of this invention. However, as also indicated hereinbefore, substantially any liquid possessing the characteristic of sufficient fluidity, or which may be rendered sufficiently fluid by temperature variations, etc., to enable spray application is also applicable in the practice of the present invention. Suitable liquids, or classes of liquids are, for example, aqueous solutions, liquid hydrocarbons both aliphatic and aromatic, alcohols, aldehydes, ketones, organic or carboxylic acids, amines, oils and the like. The following sets forth specific illustrations of some of the many suitable liquids.

One hundred pounds of milled, dried and cleaned diatomaceous earth, having characteristics comparable to the material of Example I, was blended with 3.0 pounds, on a moisture free basis, of pulverized soda ash flux to form a stock feed. A five pound sample of this stock feed was used in each of the following runs. The first sample, designated A, was calcined in a conventional manner without the spray agglomeration pretreatment to serve as a control for comparison with the remaining runs. The five pound samples designated B through L were sprayed with approximately equal volumes of each of the following materials while agitated in a ribbon blender.

| Sample | Liquid Applied | Amount in Pounds |
|---|---|---|
| B | Water | 2.52 |
| C | Methanol | 2.05 |
| D | Benzene | 2.34 |
| E | Methylethyl ketone | 2.20 |
| F | Stoddard solvent | 2.07 |
| G | Perchlorethylene | 4.00 |
| H | #2 Fuel oil | 2.18 |
| I | Glycerine | 3.70 |
| J | Tri-ethanol amine | 2.85 |
| K | Oleic acid | 2.45 |
| L | Linseed oil | 2.42 |

The spray agglomerated samples were air dried for approximately two days and the liquid phase completely evaporated from samples C, D, E and G while sample B retained 13.2% water. The residual inflammable liquids of samples F and H were burned off prior to calcination to reduce the fire hazard. Samples I through L appeared to retain substantially all of the sprayed liquids and burst into flame when charged into the kiln. Each sample was calcined in the same manner, i.e., a residence time of 30 minutes at a kiln temperature of 2000° F. Subsequent to calcination all samples were screened through a No. 10 mesh to provide a uniform mill feed. Milling of the samples comprised passing each through a Gruendler mill fan operating at 3600 r.p.m.

The samples exhibited the following product properties and filtration characteristics:

| Sample | Wet Density, lb./cu. ft. | Retained on 150 M. sieve, percent | Sugar Flow Rate vs. Sample "A" as 100% | Sugar Clarity vs. Sample "A" as 100% |
|---|---|---|---|---|
| A | 15.7 | 7.8 | 100 | 100 |
| B | 16.5 | 11.5 | 173 | 78 |
| C | 16.4 | 2.9 | 160 | 83 |
| D | 16.5 | 2.5 | 121 | 81 |
| E | 16.5 | 2.8 | 135 | 81 |
| F | 15.7 | 2.9 | 127 | 81 |
| G | 15.7 | 2.0 | 161 | 83 |
| H | 15.7 | 3.0 | 194 | 79 |
| I | 17.4 | 9.5 | 135 | 79 |
| J | 14.9 | 23.5 | 166 | 77 |
| K | 14.2 | 16.6 | 201 | 79 |
| L | 13.6 | 9.7 | 240 | 76 |

The foregoing data unquestionably illustrates that liquids of substantially any kind or class may be advantageously and successfully utilized in the agglomeration of the diatomaceous earth particles and the carrying out of this invention.

From the foregoing it is clear that the procedure of this invention can be used for several purposes in commercial practice. As indicated in Example I, this invention enables the use of a straight calcining procedure for the manufacture of filter aids with flow rates heretofore obtainable only by the use of flux during calcination. The data of Example IV establishes that lower calcination temperatures may be used to form products comparable to those calcined by higher temperatures, if the pretreatment procedure of this invention is employed. Hence, it is clear that filter aids comparable to those formed by more expensive procedures can be formed more economically when employing the procedure of this invention. Example II indicates clearly that filter aid materials of flow rates higher than those heretofore obtained can be formed in accordance with this invention. Obviously, the production of such premium products by use of this invention is of commercial benefit. The use of this invention in the formation of commercially acceptable filter aids from low grade crudes not heretofore considered suitable for the manufacture of such products, as indicated in the data of Example III, is also of apparent significance.

It will be appreciated that the calcining technique of this invention may have uses other than in the production of fast flow rate filter aids. For example, the benefits of the lower calcining temperatures which may be employed in this invention may also be used to manufacture fillers of diatomaceous earth having improved color characteristics over products conventionally made. Additionally, the procedure of this invention results in a less abrasive particle than heretofore obtained. This improved characteristic is of obvious benefit in products used as fillers as well as filter aids.

It will be understood that the details given herein are for the purpose of illustration, not restriction, and that variations within the spirit of the invention are intended to be included in the scope of the appended claims.

What I claim is:

1. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount sufficient to plasticize the mixture whereby the liquid is distributed throughout the mass of earth, then subjecting the thus treated diatomaceous earth particles to calcination.

2. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount sufficient to plasticize the mixture whereby the liquid is distributed throughout the mass of earth, then subjecting the thus treated diatomaceous earth particles to calcination in the presence of a flux in amount sufficient to effect sintering of the diatomaceous earth particles during calcination.

3. The method of manufacturing an improved calcined diatomaceous earth which comprises mixing with diatomaceous earth particles finely divided flux in amount sufficient to effect sintering of said particles during calcination, agglomerating the finely divided diatomaceous earth particles by mixing said particles while substantially preserving the structure thereof and adding to the moving mass of particles atomized droplets of liquid in amount sufficient to plasticize the mixture whereby the liquid is distributed throughout the mass of earth, then subjecting the thus treated diatomaceous earth particles to calcination.

4. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount sufficient to plasticize the mixture whereby the liquid is distributed throughout the mass of earth, said liquid comprising a solution of a flux which is present in the applied liquid in amount sufficient to effect sintering of the diatomaceous earth particles during calcination, then subjecting the thus treated diatomaceous earth particles to calcination.

5. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount sufficient to plasticize the mixture whereby the liquid is distributed throughout the mass of earth, adding to the thus agglomerated earth finely divided flux particles in amount sufficient to effect sintering of the diatomaceous earth particles during calcination, then subjecting the thus treated diatomaceous earth particles to calcination.

6. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount approximately 10–100% by weight of the dry earth whereby the liquid is distributed throughout the mass of earth, then subjecting the thus treated diatomaceous earth particles to calcination.

7. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount approximately 10–100% by weight of the dry earth whereby the liquid is distributed throughout the mass of earth, the subjecting the thus treated diatomaceous earth particles to calcination in the presence of a flux in amount sufficient to effect sintering of the diatomaceous earth particles during calcination.

8. The method of manufacturing an improved calcined diatomaceous earth which comprises mixing with diatomaceous earth particles finely divided flux in amount sufficient to effect sintering of said particles during calcination, agglomerating the finely divided diatomaceous earth particles by mixing said particles while substantially preserving the structure thereof and adding to the moving mass of particles atomized droplets of liquid in amount approximately 10–100% by weight of dry earth whereby the liquid is distributed throughout the mass of earth, then subjecting the thus treated diatomaceous earth particles to calcination.

9. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount approximately 10–100% by weight of the dry earth whereby the liquid is distributed throughout the mass of earth, said liquid comprising a solution of a flux which is present in the applied liquid in amount sufficient to effect sintering of the diatomaceous earth particles during calcination, then subjecting the thus treated diatomaceous earth particles to calcination.

10. The method of manufacturing an improved calcined diatomaceous earth which comprises agglomerating finely divided diatomaceous earth particles by mixing said particles while substantially preserving the structure thereof and adding to the moving mass of particles atomized droplets of liquid in amount approximately 10–100% by weight of the dry earth whereby the liquid is distributed throughout the mass of earth, adding to the thus agglomerated earth finely divided flux particles in amount sufficient to effect sintering of the diatomaceous earth particles during calcination, then subjecting the thus treated diatomaceous earth particles to calcination.

11. The method of manufacturing an improved calcined diatomaceous earth which comprises agglomerating finely divided diatomaceous earth particles by mixing said particles while substantially preserving the structure thereof and adding to the moving mass of particles atomized droplets of water in amount sufficient to plasticize the mixture whereby the water is distributed throughout the mass of earth, then subjecting the thus treated diatomaceous earth particles to calcination.

12. The method of manufacturing an improved calcined diatomaceous earth which comprises agglomerating finely divided diatomaceous earth particles by mixing said particles while substantially preserving the structure thereof and adding to the moving mass of particles atomized droplets of water in amount approximately 10–100% by weight of the dry earth whereby the water is distributed throughout the mass of earth, then subjecting the thus treated diatomaceous earth particles to calcination in the presence of a flux in amount sufficient to effect sintering of the diatomaceous earth particles during calcination.

13. The method of manufacturing an improved calcined diatomaceous earth which comprises mixing with diatomaceous earth particles finely divided flux in amount sufficient to effect sintering of said particles during calcination, agglomerating the finely divided diatomaceous earth particles by mixing said particles while substantially preserving the structure thereof and adding to the moving mass of particles atomized droplets of water in amount approximately 10–100% by weight of the dry earth whereby the water is distributed throughout the mass of earth, then subjecting the thus treated diatomaceous earth particles to calcination.

14. The method of manufacturing an improved calcined diatomaceous earth which comprises agglomerating finely divided diatomaceous earth particles by mixing said particles while substantially preserving the structure thereof and adding to the moving mass of particles atomized droplets of a solution in amount approximately 10–100% by weight of the dry earth whereby the solution is distributed throughout the mass of earth, said solution comprising an aqueous solution of a flux which is present in the applied solution in amount sufficient to effect sintering of the diatomaceous earth particles during calcination, then subjecting the thus treated diatomaceous earth particles to calcination.

15. The method of manufacturing an improved calcined diatomaceous earth which comprises agglomerating finely divided diatomaceous earth particles by mixing said particles while substantially preserving the structure thereof and adding to the moving mass of particles atomized droplets of water in amount approximately 10–100% by weight of the dry earth whereby the water is distributed throughout the mass of earth, adding to the thus agglomerated earth finely divided flux particles in amount sufficient to effect sintering of the diatomaceous earth particles during calcination, then subjecting the thus treated diatomaceous earth particles to calcination.

16. The method of manufacturing an improved calcined diatomaceous earth which comprises agglomerating finely divided diatomaceous earth particles by mixing said particles while substantially preserving the structure thereof and adding to the moving mass of particles atomized droplets of water in amount approximately 10–100% by weight of the dry earth whereby the water is distributed throughout the mass of earth, then subjecting the thus treated diatomaceous earth particles to calcination in the presence of sodium carbonate flux in amount up to approximately 20% by weight of the diatomaceous earth.

17. The method of manufacturing an improved calcined diatomaceous earth which comprises agglomerating finely divided diatomaceous earth particles by mixing said particles while substantially preserving the structure thereof and adding to the moving mass of particles atomized droplets of an aqueous sodium carbonate solution in amount approximately 10–100% by weight of the dry earth whereby the solution is distributed throughout the mass of earth, said solution comprising an aqueous solution of a sodium carbonate flux which is present in amount up to approximately 20% by weight of the dry earth, then subjecting the thus treated diatomaceous earth particles to calcination.

18. The method of manufacturing an improved calcined diatomaceous earth which comprises calcining discrete agglomerates of finely divided diatomaceous earth, said discrete agglomerates being formed prior to calcination by adding atomized droplets of liquid to a moving mass of diatomaceous earth particles in amount sufficient to plasticize the diatomaceous earth particles while mixing said materials to obtain distribution of said liquid throughout the mass of earth.

19. The method of manufacturing an improved calcined diatomaceous earth which comprises calcining discrete agglomerates of finely divided diatomaceous earth, said discrete agglomerates being formed prior to calcination by adding atomized droplets of liquid to a moving mass of diatomaceous earth particles in amount approximately 10–100% by weight of the diatomaceous earth while mixing said materials to obtain distribution of said liquid throughout the mass of earth.

20. The method of manufacturing an improved calcined diatomaceous earth which comprises calcining discrete agglomerates of finely divided diatomaceous earth, said discrete agglomerates being formed prior to calcination by adding atomized droplets of water to a moving mass of diatomaceous earth particles in amount approximately 10–100% by weight of the dry earth while mixing said materials to obtain distribution of the water throughout the mass of earth.

References Cited in the file of this patent

UNITED STATES PATENTS

| | | |
|---|---|---|
| 1,970,280 | Cummins | Aug. 14, 1934 |
| 2,480,579 | Holuba | Aug. 30, 1949 |
| 2,686,161 | Stewart | Aug. 10, 1954 |
| 2,693,456 | Fennell | Nov. 2, 1954 |